US010050992B2

(12) United States Patent
Thyni et al.

(10) Patent No.: US 10,050,992 B2
(45) Date of Patent: *Aug. 14, 2018

(54) MITIGATING THE IMPACT FROM INTERNET ATTACKS IN A RAN USING INTERNET TRANSPORT

(71) Applicant: Telefonaktiebolaget LM Ericsson (publ), Stockholm (SE)

(72) Inventors: Tomas Thyni, Järfälla (SE); Mats Forsman, Rönninge (SE); Mats Ullerstig, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 437 days.

This patent is subject to a terminal disclaimer.

(21) Appl. No.: 14/427,649

(22) PCT Filed: Feb. 9, 2015

(86) PCT No.: PCT/SE2015/050142
§ 371 (c)(1),
(2) Date: Mar. 12, 2015

(87) PCT Pub. No.: WO2016/130050
PCT Pub. Date: Aug. 18, 2016

(65) Prior Publication Data
US 2016/0234248 A1 Aug. 11, 2016

(51) Int. Cl.
*H04L 29/06* (2006.01)
*H04W 12/12* (2009.01)
(Continued)

(52) U.S. Cl.
CPC ...... *H04L 63/1441* (2013.01); *H04L 63/1425* (2013.01); *H04W 12/12* (2013.01);
(Continued)

(58) Field of Classification Search
CPC .................................... H04L 63/0441
See application file for complete search history.

(56) References Cited

U.S. PATENT DOCUMENTS

| 9,397,769 B2 | 7/2016 | Mirbagheri et al. |
| 2006/0276173 A1 | 12/2006 | Srey et al. |
(Continued)

FOREIGN PATENT DOCUMENTS

| WO | 2008067335 A2 | 6/2008 |
| WO | 2010050983 A1 | 5/2010 |

OTHER PUBLICATIONS

Unknown, Author, "Intrusion detection system", Wikipedia, the free encyclopedia, Available online at: http://wikipedia.org/wiki/Intrusion_detection_system, Oct. 27, 2014, 1-7.
(Continued)

*Primary Examiner* — Simon P Kanaan
(74) *Attorney, Agent, or Firm* — Murphy, Bilak & Homiller, PLLC

(57) ABSTRACT

The present disclosure relates to methods and devices for mitigating the impact from Internet attacks in a Radio Access Network, RAN, using Internet transport. This object is obtained by a method performed in network node in a Core network, CN, of mitigating the impact from Internet attacks in a Radio Access Network, RAN, using Internet transport. The method comprises receiving, from at least a network node in a Radio Access Network, RAN, an intrusion detection report, the intrusion detection report comprises information about an Internet attack in the RAN. The method further comprises selecting based on the information, a mitigation action, the mitigation action mitigating the impact of the attack on the RAN service level. Further the method comprises performing the selected mitigation action to mitigate the impact on the RAN service level.

39 Claims, 5 Drawing Sheets

(51) Int. Cl.
*H04W 84/04* (2009.01)
*H04W 36/00* (2009.01)

(52) U.S. Cl.
CPC ...... *H04L 63/0227* (2013.01); *H04L 63/1458* (2013.01); *H04W 36/0055* (2013.01); *H04W 84/04* (2013.01)

(56) References Cited

U.S. PATENT DOCUMENTS

| | | | |
|---|---|---|---|
| 2007/0123214 A1* | 5/2007 | Mock | H04L 63/1416 455/410 |
| 2008/0086776 A1* | 4/2008 | Tuvell | G06F 21/564 726/24 |
| 2008/0114885 A1* | 5/2008 | Kulkarni | G06Q 40/00 709/229 |
| 2008/0295171 A1 | 11/2008 | Singh et al. | |
| 2009/0088147 A1* | 4/2009 | Bu | H04L 63/1416 455/423 |
| 2012/0151033 A1 | 6/2012 | Baliga et al. | |
| 2013/0344823 A1* | 12/2013 | Almgren | H04W 12/12 455/90.1 |
| 2015/0180898 A1* | 6/2015 | Liljenstam | H04W 12/12 726/23 |

OTHER PUBLICATIONS

Unknown, Author, "Intrusion prevention system", Wikipedia, the free encyclopedia, Available online at: http://en.wikipedia.org/wiki/Intrusion_prevention_system, Oct. 27, 2014, 1-3.

3GPP, "Updated version of Rationale and track of security decisions in Long Term Evolved RAN/3GPP System Architecture Evolution", Nokia et al., 3GPP TSG SA WG3 Security—SA3#45, DRAFT S3-060840, Dulles, USA, Oct. 31-Nov. 3, 2006, 1-66.

* cited by examiner

US 10,050,992 B2

MITIGATING THE IMPACT FROM INTERNET ATTACKS IN A RAN USING INTERNET TRANSPORT

TECHNICAL FIELD

The present disclosure relates to methods, devices and computer programs of mitigating the impact of Internet attacks in a RAN using Internet transport.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. The Universal Terrestrial Radio Access Network, UTRAN, is the radio access network of a UMTS and Evolved UTRAN, E-UTRAN, is the radio access network of an LTE system. In an UTRAN and an E-UTRAN, a User Equipment, UE or wireless device, is wirelessly connected to a Radio Base Station, RBS, commonly referred to as a NodeB, NB, in UMTS, and as an evolved NodeB, eNodeB or eNB, in LTE. An RBS is a general term for a radio network node capable of transmitting radio signals to a UE and receiving signals transmitted by a UE.

Traditional transport services e.g. leased lines or Virtual Private Networks, VPNs, are used for transport in the Radio Access Network, RAN. These transport services are very expensive in particular for high bandwidth data services. Internet transport services are much cheaper than traditional transport services. Using Internet for transport services in the RAN will lower the transport cost dramatically. An Internet transport service cost can be a fraction of the cost of a traditional leased lines and VPN services. There is a clear trend in Enterprise networking to use Internet transport services for transport and Mobile Network Operators are starting to put forward this requirement also for the RAN.

Using Internet as transport will expose the connected equipment in the RAN to various attack threats e.g. hackers, viruses, bot-nets, trojans etc. Hackers will search connected devices in the RAN for vulnerability. An attack can start with a port-scan of an IP address on the equipment in the RAN to figure out open ports and then try to connect to the equipment in order to intrude the RAN-equipment.

A counter measurement used in transport networks today are Intrusion Detection System, IDS, and Intrusion Prevention System, IPS.

An IDS is a device or software application that monitors network or system activities for malicious activities or policy violations and produces reports to a management station. There are different types of IDS, but they all are designed to detect suspicious traffic in different ways. An IDS is primarily focused on identifying possible incidents, logging information about them, and reporting attempts.

An IPS can respond to a detected threat by attempting to prevent it from succeeding. IPS use several techniques to counter the attack e.g. dropping packets from attacker, changing the security environment (e.g. reconfiguring a firewall) or making changes in attacker's packet headers.

The IPS functionality tries to stop or limit the impact of a network attack by working in-line with the real network traffic, to be able to take actions to actively prevent or block intrusions or denial of services attacks that are detected. These actions are in the form of activating filters to drop/block IP packets, resetting the connection, reassemble fragmented IP packet etc.

One problem when a radio access network and core network is connected to an unsecure network like the Internet is that the IPS has no knowledge of the impact an Internet attack will have on the RAN and the services delivered to the end-users connected to the RAN.

The IPS can take an action to drop traffic from an Internet attacker, but at the same time the usable capacity for e.g. a RBS in the RAN will be limited. This will result in that the RBS in the RAN will still try to serve equal amount of UEs as if the RBS had expected full capacity on the Internet transport services. This will result in very limited end-user performance and Quality of Experience, QoE. It is only when the RBS has so low/limited capacity that the radio signalling can't get through that the RBS will understand that the RBS must be taken out of service. The RBS can't detect that end-user traffic between a S/PGW in the CN and the RBS is dropped due to an Internet attack, even if a significant part of the packets are dropped. The impact will only be seen by the UE as a very limited connection/service.

There is therefore a need for an improved solution for handling Internet attacks in a RAN using Internet transport, which solution solves or at least mitigates at least one of the above mentioned problems.

SUMMARY

An object of the present disclosure is to provide a method, device and computer program to mitigating the impact from Internet attacks in a Radio Access Network, RAN, using Internet transport, which seeks to mitigate, alleviate, or eliminate one or more of the above-identified deficiencies in the art and disadvantages singly or in any combination.

According to aspects, the disclosure presents a method, performed in a network node in a Core network, CN, of mitigating the impact from Internet attacks in a Radio Access Network, RAN, using Internet transport. The method comprises receiving from at least a network node in a Radio Access Network, RAN, an intrusion detection report. The intrusion detection report comprises information about an Internet attack in the RAN. Selecting based on the information, a mitigation action, and the mitigation action mitigating the impact of the attack on the RAN service level, and performing the selected mitigation action to mitigate the impact on the RAN service level.

According to further aspects, the disclosure relates to a computer program comprising computer program code which, when executed in a network node in the CN, causes the network node to execute the method according to above.

According to further aspects, the disclosure relates to a network node in a Core network, CN, of mitigating the impact from Internet attacks in a Radio Access Network, RAN, using Internet transport, comprising a processor and a memory. The memory containing instructions executable by the processor whereby the network node is operative to. Receive, from at least one radio network node, an intrusion detection report, the intrusion detection report comprises information about an Internet attack in the RAN. Selecting based on the information, a mitigation action, the mitigation action mitigating the impact of the attack on the RAN service level. And perform the selected mitigation action to mitigate the impact on the RAN service level.

According to aspects, the disclosure presents a method, performed in a network node in a Radio Access Network, RAN, using Internet transport, wherein the RAN is connected to a Core Network, CN, of mitigating the impact from Internet attacks. The method comprises obtaining intrusion detection information informing the network node that the RAN is under attack. Compiling, based on the intrusion detection information, an intrusion detection report, the intrusion detection report comprising information about the Internet attack, and transmitting the intrusion detection report to the CN.

According to further aspects, the disclosure relates to a computer program comprising computer program code which, when executed in a network node in the RAN, causes the network node to execute the method according to above.

According to further aspects, the disclosure relates to a network node in a Radio Access Network, RAN, using Internet transport, wherein the RAN is connected to a Core Network, CN, of mitigating the impact from Internet attacks, comprising a processor and a memory. The memory contains instructions executable by the processor whereby the network node is operative to obtain intrusion detection information informing the network node that the RAN is under attack. Compile, based on the intrusion detection information, an intrusion detection report, the intrusion detection report comprises information about the Internet attack, and transmit the intrusion detection report to the CN.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Figure 1:
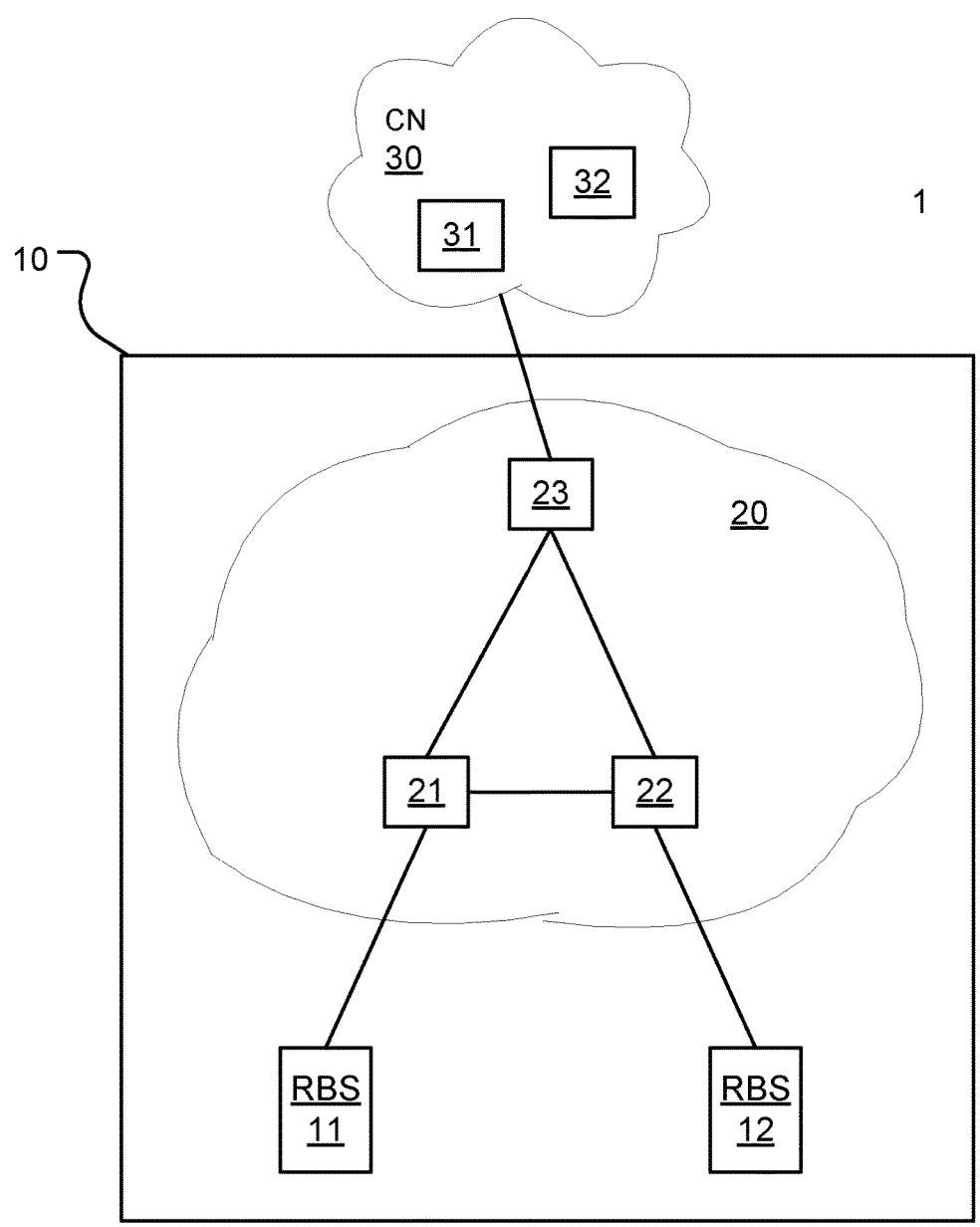
FIG. 1 schematically illustrates a cellular communication network in which exemplary embodiments of the present disclosure can be implemented.

Aspects of the present disclosure will be described more fully hereinafter with reference to the accompanying drawings. The device, method and computer program disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

FIG. 1 schematically illustrates an example of a cellular communication network 1 in which aspects of the present disclosure can be implemented. The cellular communication network 1 comprises a radio access network, RAN, 10 and a Core network, CN, 30. Two network nodes 31, 32 are illustrated in the CN 30, but the CN 30 comprises several more network nodes. The RAN 10 comprises a radio access transport network 20. The radio access transport network 20 handles data traffic between e.g. radio base stations 11, 12 and between radio base stations 11, 12 and the CN 30. In this example of the cellular communication network 1 Internet transport services are used in the radio access transport network 20. In this example the radio access transport network 20 comprises several network nodes 21, 22, 23.

It is an object of the present disclosure to provide embodiments solving the problem of Internet attacks in the RAN 10 using Internet transport. According to an aspect of the present disclosure, a core network node 31, 32 receives an intrusion detection report from a network node 11, 12, 21, 22, 23 in the RAN 10. The intrusion detection report comprises information about an Internet attack in the RAN 10. And based on this information the core network node 31, 32 selects a mitigation action. The mitigation action mitigating the impact of the Internet attack on the RAN service level.

An example of a radio access network 10 is UTRAN, Universal Terrestrial Radio Access Network. The UTRAN is the radio access network 10 in UMTS, Universal Mobile Telecommunications System. Another radio access network 10 is E-UTRAN. The E-UTRAN is the radio access network 10 in an LTE system. The proposed methods could be performed in any node in the RAN 10 or outside the RAN 10 e.g. a cloud implementation.

Figure 2:
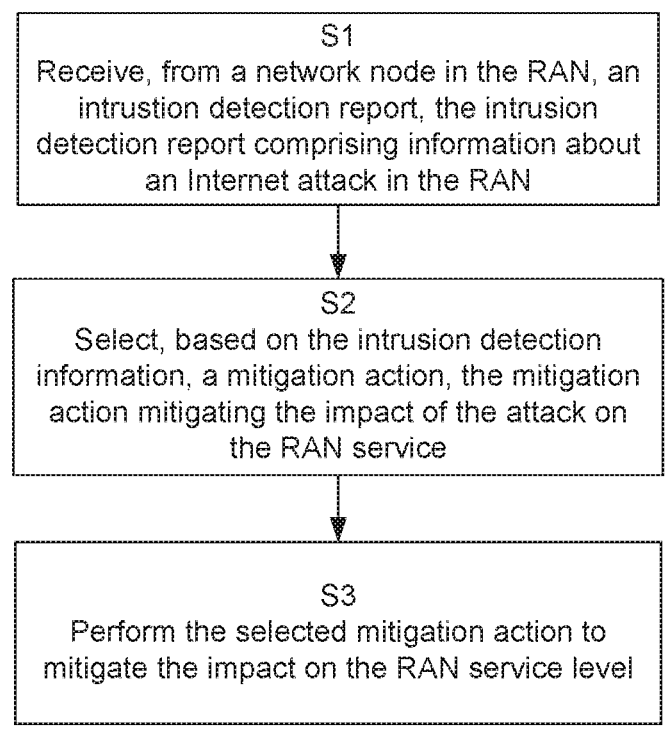
FIG. 2 is a flow chart illustrating the proposed methods performed in a network node in the Core Network.

FIG. 2 illustrates the steps in a method, performed in the network node 31, 32 in the CN 30, of mitigating the impact from Internet attacks in the RAN 10, using Internet transport. In a first step S1 the network node 31, 32 receives, from at least a network node 11, 12, 21, 22, 23 in the RAN 10, an intrusion detection report, the intrusion detection report comprises information about an Internet attack in the RAN 10. In a next step S2 the network node 31, 32 selects, based on the information, a mitigation action, the mitigation action mitigates the impact of the attack on the RAN service level. The method further comprises, in a next step S3 that the network node 31, 32 performs the selected mitigation action to mitigate the impact on the RAN service level.

Stated differently in the step S2 the network node 31, 32 chooses, based on the information, the mitigation action that can mitigate the impact of the attack on the RAN service level. According to one aspect of the present disclosure the network node 31, 32 selects the mitigation action that best can mitigate the impact on the attack on the RAN service level. Thus will the impact on the RAN service level due to the Internet attack be reduced or eliminated when the mitigation action is performed in step S3.

According to one aspect of the present disclosure the attacked nod is the RAN node 11, 12, 21, 22, 23 that transmits the intrusion detection report. In another aspect of the present disclosure the intrusion detection report is transmitted by any neighboring RAN node 11, 12, 21, 22, 23 to the network node 31, 32 that is under an Internet attack. According to another aspect of the present disclosure the network node 11, 12, 21, 22, 23 that transmits the intrusion detection report has received the intrusion detection information from a neighboring RAN node 11, 12, 21, 22, 23 or a User Equipment, UE.

As mentioned above there are several mitigations actions that the network node 31, 32 can select from, in step S2, based on the information received in step S1. Some of the mitigations actions will be described below.

In one aspect of the present disclosure the network node 31, 32 is a Mobility Management Entity, MME. According to one aspect the MME has received the intrusion detection report over a S1-C interface. The S1-C interface is an interface between the MME and an eNodeB in the RAN 10.

According to an aspect of the present disclosure the mitigation action comprises that the MME will reject all handover requests towards an attacked network node 11, 12, 21, 22, 23. In this aspect if the network node 11, 12, 21, 22, 23 suffers from an Internet attack, the network node 11, 12, 21, 22, 23 can have limited Internet transport capacity, processing capacity, memory or buffer capacity, it is advantageous to reject all handover requests towards the attacked network node 11, 12, 21, 22, 23. This will increase the RAN service level for UEs in the RAN 10. The network node 11, 12, 21, 22, 23 can be affected by an Internet attack in different ways. The internet attack can e.g. result in limited Internet transport capacity, processing capacity. The internet attack can also affect the memory and the buffers in the network node 11, 12, 21, 22, 23.

In another aspect of the present disclosure the network node 31, 32 is a S/PGW. According to one aspect the S/PGW receives the intrusion detection report over a GTP-C or a GTP-U interface.

In another aspect of the present disclosure the rejection of all handover requests towards an attacked network node 11, 12, 21, 22, 23 further comprises a timer-value defining the validity time for the mitigation action. In other words in this aspect the MME 31, 32 will reject all handover requests during a certain amount of time defined by the received timer-value.

According to another aspect of the present disclosure the selected mitigation action further comprises the MME 31, 32 transmitting information to a Packet Data Network Gateway, S/PGW, to schedule less traffic to a network node 11, 12, 21, 22, 23 in the RAN 10 affected by the Internet attack.

In an exemplary embodiment of the present disclosure the network node 31, 32 is a Serving GPRS Support Node, SGSN. One interface between an RNC in the RAN 10 and SGSN is called Iu-PS. According to one aspect of the present disclosure the SGSN 31, 32 receives the intrusion detection report over the Iu-PS interface. Another interface between to the SGSN 31, 32 is the Gb interface. According to one aspect of the present disclosure the SGSN 31, 32 receives the intrusion detection report over the Gb interface.

In an exemplary embodiment of the present disclosure the network node 31, 32 is a Mobile switching center, MSC. One interface between an RNC in the RAN 10 and MSC 31, 32 is called Iu-PS. According to one aspect of the present disclosure the MSC 31, 32 receives the intrusion detection report over the Iu-CS interface.

Another interface between to the MSC 31, 32 is the A interface. According to one aspect of the present disclosure the MSC 31, 32 receives the intrusion detection report over the A interface.

Figure 3:
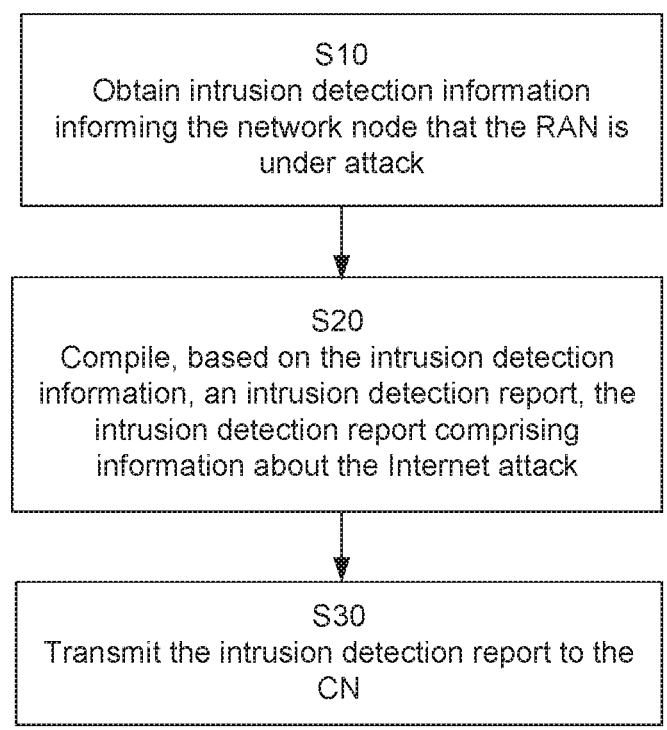
FIG. 3 is a flow chart illustrating the proposed methods performed in a network node in the RAN.

FIG. 3 illustrates the steps in a method, performed in a network node 11, 12, 21, 22 and 23 in a Radio Access Network, RAN, 10 using Internet transport, of mitigating the impact from Internet attacks. In a first step S10 the network node 11, 12, 21, 22 and 23 obtains intrusion detection information informing the network node 11, 12, 21, 22 and 23 that the RAN 10 is under attack. In a next step S20 the network node 11, 12, 21, 22 and 23 compiles, based on the intrusion detection information, an intrusion report, the intrusion detection report comprises information about the Internet attack. The method further comprises, in a next step S30 that the network node 11, 12, 21, 22 and 23 transmits the selected intrusion detection report to the CN 30.

In other words in the first step S10 the network node 11, 12, 21, 22 and 23 can receive the intrusion detection information from another network node 11, 12, 21, 22 and 23 or obtain the intrusion detection information from the within the network node 11, 12, 21, 22 and 23.

Stated differently in the step S20 the network node 11, 12, 21, 22 and 23 compiles, based on the intrusion detection information, the intrusion detection report that can inform the CN 30 of the Internet attack. Thus will the impact on the RAN service level due to the Internet attack be reduced or eliminated when the CN 30 receives the intrusion detection report and performs a mitigation action as descried above.

According to one aspect of the present disclosure the network node 11, 12, 21, 22 and 23 receives the intrusion detection information from an IDS (not shown). The IDS can according to aspects of the present disclosure be located in different network nodes 11, 12, 21, 22 and 23 in the RAN 10. In one exemplary embodiment the IDS is located in the network node 11, 12.

According to one aspect of the present disclosure the intrusion detection report further comprises at least one suggested mitigation action.

According to another aspect of the present disclosure the IDS is located within the network node 11, 12, 21, 22 and 23. In this aspect the network node 11, 12, 21, 22 and 23 obtains the intrusion detection information directly from the network node 11, 12, 21, 22 and 23.

As mentioned above, in an exemplary embodiment of the present disclosure the network node 31, 32 is a SGSN. In this aspect of the present disclosure the intrusion detection report can comprises information about the Internet attack to the SGSN. According to one aspect of the present disclosure the intrusion detection report is transmitted to the SGSN over an Iu-PS interface.

Another interface between to the SGSN is the Gb interface. According to one aspect of the present disclosure the intrusion detection report is transmitted to the SGSN over the Gb interface.

Also, as mentioned above, in an exemplary embodiment of the present disclosure the network node 31, 32 is a MSC. In this aspect of the present disclosure the intrusion detection report can comprises information about the Internet attack to the MSC. According to one aspect of the present disclosure the intrusion detection report is transmitted to the MSC over an Iu-CS interface.

Another interface between to the SGSN is an A interface. According to one aspect of the present disclosure the intrusion detection report is transmitted to the SGSN over the A interface.

In an exemplary embodiment of the present disclosure the network node 21, 22, 23 is a Radio Network Controller, RNC. In this aspect of the present disclosure the intrusion detection report can comprises information about the Internet attack to the RNC 21, 22, 23.

According to another exemplary embodiment of the present disclosure the network node 21, 22, 23 is a Base Station Controller, BSC. In this aspect of the present disclosure the intrusion detection report can comprises information about the Internet attack to the BSC 21, 22, 23.

Figure 4:
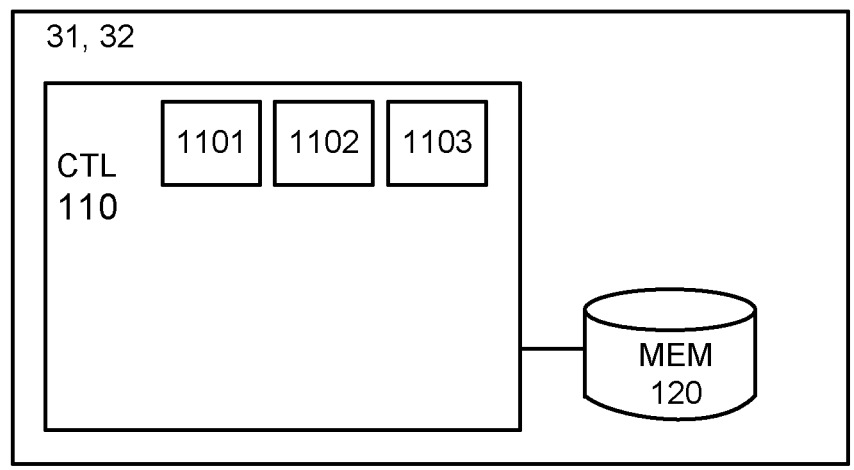
FIG. 4 is a schematic diagram illustrating a network node in the Core Network according to an exemplary embodiment of the present disclosure.

Turning now to FIG. 4, a schematic diagram is disclosed illustrating an exemplary embodiment of the network node 31, 32 in the CN 30, of mitigating the impact from Internet attacks in the RAN 10 using Internet transport. The network node 31, 32 comprises a processor 110 and a memory 120, the memory 212 containing instructions executable by the processor 110. The processor 110 is a Central Processing Unit, CPU, microcontroller, Digital Signal Processor, DSP, or any other suitable type of processor capable of executing computer program code. The memory 212 is a Random Access Memory, RAM, a Read Only Memory, ROM, or a persistent storage, e.g. a single or combination of magnetic memory, optical memory, or solid state memory or even remotely mounted memory. According to one aspect, the disclosure further relates to the above mentioned computer program, comprising computer readable code which, when run on the network node 31, 32 causes the network node 31, 32 to perform any of the aspects of the method described above.

When the above-mentioned computer program code is run in the processor 110 of the network node 31, 32 it causes the network node 31, 32 to receiving, from at least one radio network node 11, 12, 21, 22, 23 an intrusion detection report, the intrusion detection report comprising information about an Internet attack in the RAN 10. The computer program codes further causes the network node 31, 32 to select, based on the intrusion detection information, a mitigation action, the mitigation action mitigating the impact of the attack on the RAN service. Further, the computer program code causes the network node 31, 32 to perform the selected mitigation action to mitigate the impact on the RAN service level.

According to one aspect, the disclosure further relates to the above mentioned computer program, comprising computer readable code which, when run on the network node 31, 32 causes the network node 31, 32 to perform any of the aspects of the method described above.

According to one aspect of the disclosure the processor 110 comprises one or several of:
 a receiver 1101 adapted receive, from at least one radio network node, an intrusion detection report, the intrusion detection report comprising information about an Internet attack in the RAN;
 a selecting module 1102 adapted to select, based on the intrusion detection information, a mitigation action, the mitigation action mitigating the impact of the attack on the RAN service; and
 a performing module 1103 adapted to perform the selected mitigation action to mitigate the impact on the RAN service level.

According to a further aspect the network node 31, 32 is a MME further adapted to receive the intrusion detection report over the S1-C interface. According to one aspect the network node 31, 32 comprises a receiver module 1101 configured for this purpose.

In another aspect of the present disclosure the network node 31, 32 is a SGSN core-node further adapted to receive the intrusion detection report over a Iu-PS interface. According to one aspect the network node 31, 32 comprises a receiver module 1101 configured for this purpose.

In yet another aspect of the present disclosure the network node 31, 32 is a MSC core-node further adapted to receive the intrusion detection report over a Iu-CS interface. According to one aspect the network node 31, 32 comprises a receiver module 1101 configured for this purpose.

According to a further aspect of the present disclosure the network node 31, 32 is a SGSN core-node further adapted to receive the intrusion detection report over a Gb interface. According to one aspect the network node 31, 32 comprises a receiver module 1101 configured for this purpose.

In yet another aspect of the present disclosure the network node 31, 32 is a MSC core-node further adapted to receive the intrusion detection report over an A interface. According to one aspect the network node 31, 32 comprises a receiver module 1101 configured for this purpose.

The receiver module 1101, selecting module 1102 and performing module 1103 are implemented in hardware or in software or in a combination thereof. The modules 1101, 1102 and 1103 are according to one aspect implemented as a computer program stored in the memory 120 which run on the processing circuitry 110. The network node 11, 12, 21, 22 and 23 is further configured to implement all the aspects of the disclosure as described in relation to the methods above.

Figure 5:
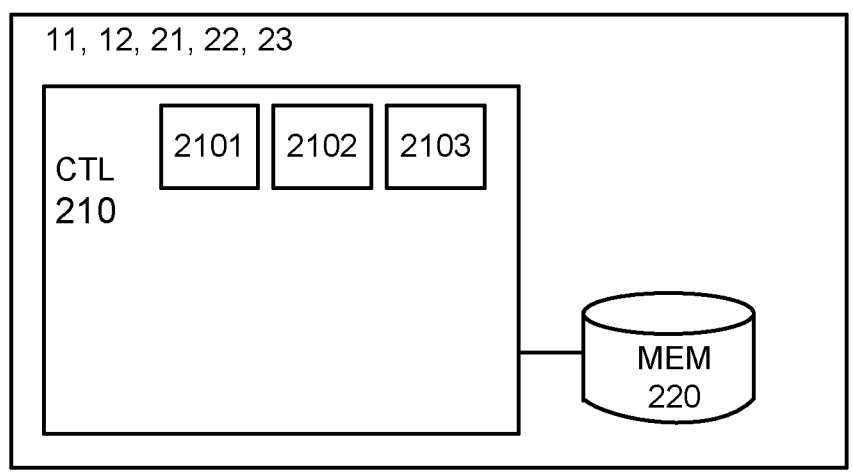
FIG. 5 is a schematic diagram illustrating a network node in the RAN according to an exemplary embodiment of the present disclosure.

Turning now to FIG. 5, a schematic diagram is disclosed illustrating an exemplary embodiment of the network node 11, 12, 21, 22 and 23 in the RAN 10, using Internet transport of mitigating the impact from Internet attacks. The network node 11, 12, 21, 22 and 23 comprises a processor 210 and a memory 220, the memory 210 containing instructions executable by the processor 210. The processor 210 is a Central Processing Unit, CPU, microcontroller, Digital Signal Processor, DSP, or any other suitable type of processor capable of executing computer program code. The memory 210 is a Random Access Memory, RAM, a Read Only Memory, ROM, or a persistent storage, e.g. a single or combination of magnetic memory, optical memory, or solid state memory or even remotely mounted memory.

According to one aspect, the disclosure further relates to the above mentioned computer program, comprising computer readable code which, when run on the network node 11, 12, 21, 22 and 23 causes the network node 11, 12, 21, 22 and 23 to perform any of the aspects of the method described above.

When the above-mentioned computer program code is run in the processor 210 of the network node 11, 12, 21, 22 and 23 it causes the network node 11, 12, 21, 22 and 23 to obtain S10 intrusion detection information informing the network node 11, 12, 21, 22 and 23 that the RAN 10 is under attack. The computer program codes further causes the network node 11, 12, 21, 22 and 23 to compile S20 an intrusion detection report, the intrusion detection report comprises information about the Internet attack. Further, the computer program code causes the network node 11, 12, 21, 22 and 23 to transmitting S30 the intrusion detection report to the CN.

According to one aspect, the disclosure further relates to the above mentioned computer program, comprising computer readable code which, when run on the network node 11, 12, 21, 22 and 23, causes the network node 11, 12, 21, 22 and 23 to perform any of the aspects of the method described above.

According to one aspect of the disclosure the processor 110 comprises one or several of:
 an obtaining module 2101 adapted to obtain intrusion detection information informing the network node that the RAN is under attack;
 a compiling module 2102 adapted to compile, based on the intrusion detection information, an intrusion detection report, the intrusion detection report comprises information about the Internet attack; and
 a transmitting module 2103 adapted to perform the selected mitigation action to mitigate the impact on the RAN service level.

According to a further aspect the network node 11, 12, 21, 22 and 23 is further adapted to receiving the intrusion detection information from an IDS. According to one aspect the network node 11, 12, 21, 22 and 23 comprises an obtaining module 2101 configured for this purpose.

According to a further aspect the network node 11, 12, 21, 22 and 23 is further adapted to have the IDS is located within the network node. According to one aspect the network node 11, 12, 21, 22 and 23 comprises an obtaining module 2101 configured for this purpose.

According to a further aspect of the network node 31, 32 the intrusion detection report comprises information about the Internet attack to the SGSN, in the CN 30. According to one aspect the network node 31, 32 comprises a compiling module 2102 configured for this purpose.

According to a further aspect of the network node 31, 32 the intrusion detection report comprises information about the Internet attack to the MSC, in the CN 30. According to one aspect the network node 31, 32 comprises a compiling module 2102 configured for this purpose.

In another aspect of the present disclosure the network node 11, 12, 21, 22 and 23 is further adapted to transmit the intrusion detection report to the SGSN over the Iu-PS interface. According to one aspect the network node 31, 32 comprises a transmitter module 2103 configured for this purpose.

In another aspect of the present disclosure the network node 11, 12, 21, 22 and 23 is further adapted to transmit the intrusion detection report to the SGSN over the Gb interface. According to one aspect the network node 31, 32 comprises a transmitter module 2103 configured for this purpose.

According to a further aspect of the present disclosure the network node 11, 12, 21, 22 and 23 is further adapted to transmit the intrusion detection report to the MSC over the Iu-CS interface. According to one aspect the network node 31, 32 comprises a transmitter module 2103 configured for this purpose.

According to a further aspect of the present disclosure the network node 11, 12, 21, 22 and 23 is further adapted to transmit the intrusion detection report to the MSC over the A interface. According to one aspect the network node 31, 32 comprises a transmitter module 2103 configured for this purpose.

According to a further aspect of the present disclosure the network node 11, 12, 21, 22 and 23 is further adapted to transmit the intrusion detection report to a Mobility Management Entity, MME, over a S1-C interface. According to one aspect the network node 31, 32 comprises a transmitter module 2103 configured for this purpose.

The obtaining module 2101, compiling module 2102 and transmitting module 2103 are implemented in hardware or in software or in a combination thereof. The modules 2101, 2102 and 2103 are according to one aspect implemented as a computer program stored in the memory 220 which run on the processing circuitry 210. The network node 11, 12, 21, 22 and 23 is further configured to implement all the aspects of the disclosure as described in relation to the methods above.

The present disclosure is not limited to only attacks from the Internet transport network in the RAN 10. According to aspects of the present disclosure Internet transport is not used in the RAN 10. In these and in embodiments where Internet transport is used attack can also occur from other sources in the RAN 10, CN 30 or UE 13. These attacks can also be mitigated with the methods, devices and computer programs described above.

According to one aspect of the present disclosure the intrusion detection report in all above exemplary embodiments further comprises at least one suggested mitigation action.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A method, performed in a network node in a Core network (CN), of mitigating impacts from Internet attacks in a Radio Access Network (RAN) using Internet transport, the method comprising:
   receiving, from at least a network node in the RAN, an intrusion detection report, the intrusion detection report comprising information about an Internet attack in the RAN;
   selecting based on the information, a mitigation action, the mitigation action mitigating the impact of the attack on the RAN service level; and
   performing the selected mitigation action to mitigate the impact on the RAN service level.

2. The method of claim 1, wherein the intrusion detection report further comprises at least one suggested mitigation action.

3. The method of claim 1, wherein the attacked network node is the network node itself or any neighboring network node.

4. The method of claim 1, wherein the selected mitigation action comprises that a Mobility Management Entity (MME) will reject all handover requests towards an attacked network node.

5. The method of claim 4, wherein the selected mitigation action further comprises a timer-value defining the validity time for the mitigation action.

6. The method of claim 4, wherein the selected mitigation action further comprises the MME transmitting information to a Packet Data Network Gateway (S/PGW) to schedule less traffic to a network node in the RAN affected by the Internet attack.

7. The method of claim 1, wherein the network node is an MME core-node having received the intrusion detection report over a S1-C interface.

8. The method of claim 1 wherein the network node is a SGSN core-node having received the intrusion detection report over a Iu-PS interface.

9. The method of claim 1, wherein the network node is a MSC core-node having received the intrusion detection report over a Iu-CS interface.

10. The method of claim 1, wherein the network node is a SGSN core-node having received the intrusion detection report over a Gb interface.

11. The method of claim 1, wherein the network node is a MSC core-node having received the intrusion detection report over an A interface.

12. A method, performed in a network node in a Radio Access Network (RAN) using Internet transport, wherein the RAN is connected to a Core Network (CN), of mitigating impacts from Internet attacks, the method comprising:
    obtaining intrusion detection information informing the network node that the RAN is under attack;
    compiling, based on the intrusion detection information, an intrusion detection report, the intrusion detection report comprising information about the Internet attack;
    transmitting the intrusion detection report to the CN.

13. The method of claim 12, wherein the intrusion detection report further comprises at least one suggested mitigation action.

14. The method of claim 12, wherein the obtaining comprises receiving the intrusion detection information from an Intrusion Detection System (IDS).

15. The method of claim 14, wherein the IDS is located within the network node.

16. The method of claim 12, wherein the intrusion detection report is transmitted to a SGSN in the CN over an Iu-PS interface.

17. The method of claim 12, wherein the intrusion detection report is transmitted to a SGSN in the CN over an Gb interface.

18. The method of claim 12, wherein the intrusion detection report is transmitted to a MSC over an Iu-CS interface.

19. The method of claim 12, wherein the intrusion detection report is transmitted to the MSC over an A interface.

20. A non-transitory computer-readable storage medium, having stored thereupon a computer program that, when run in a network node in a Core network (CN), causes the network node to of mitigate impacts from Internet attacks in a Radio Access Network (RAN) using Internet transport, by:
    receiving, from at least a network node in the RAN, an intrusion detection report, the intrusion detection report comprising information about an Internet attack in the RAN;
    selecting based on the information, a mitigation action, the mitigation action mitigating the impact of the attack on the RAN service level; and
    performing the selected mitigation action to mitigate the impact on the RAN service level.

21. A non-transitory computer-readable storage medium, having stored thereupon a computer program that, when run in a network node in a Radio Access Network (RAN) using Internet transport, wherein the RAN is connected to a Core Network (CN), causes the network node to mitigating impacts from Internet attacks, by:
    obtaining intrusion detection information informing the network node that the RAN is under attack;
    compiling, based on the intrusion detection information, an intrusion detection report, the intrusion detection report comprising information about the Internet attack;
    transmitting the intrusion detection report to the CN.

22. A network node in a Core network (CN) in a Radio Access Network (RAN) using Internet transport, the network node comprising a processor and a memory, said memory containing instructions executable by said processor whereby said network node is configured to:
    receive, from at least one network node, an intrusion detection report, the intrusion detection report comprises information about an Internet attack in the RAN;
    select based on the information, a mitigation action, the mitigation action mitigating the impact of the attack on the RAN service level; and
    perform the selected mitigation action to mitigate the impact on the RAN service level.

23. The network node of claim 22, wherein the intrusion detection report further comprises at least one suggested mitigation action.

24. The network node of claim 22, wherein the attacked network node is the network node itself or any neighboring network node.

25. The network node of claim 22, wherein the selected mitigation action comprises that a Mobility Management Entity (MME) will reject all handover requests towards the attacked network node.

26. The network node of claim 22, wherein the network node is MME core-node having received the intrusion detection report over a S1-C interface.

27. The network node of claim 22, wherein the network node is a SGSN core-node having received the intrusion detection report over a Iu-PS interface.

28. The network node of claim 22, wherein the network node is a MSC core-node having received the intrusion detection report over a Iu-CS interface.

29. The network node of claim 22, wherein the network node is a SGSN core-node having received the intrusion detection report over a Gb interface.

30. The network node of claim 22, wherein the network node is a MSC core-node having received the intrusion detection report over an A interface.

31. A network node in a Radio Access Network (RAN) using Internet transport, wherein the RAN is connected to a Core Network (CN), the network node comprising a processor and a memory, said memory containing instructions executable by said processor whereby said network node is configured to:
    obtain intrusion detection information informing the network node that the RAN is under attack;
    compile, based on the intrusion detection information, an intrusion detection report, the intrusion detection report comprising information about the Internet attack;
    transmit the intrusion detection report to the CN.

32. The network node of claim 31, wherein the intrusion detection report further comprises at least one suggested mitigation action.

33. The network node of claim 31, wherein the obtaining comprises receiving the intrusion detection information from an Intrusion Detection System (IDS).

34. The network node of claim 33, wherein the IDS is located within the network node.

35. The network node of claim 31, wherein the intrusion detection report is transmitted to a SGSN over an Iu-PS interface.

36. The network node of claim 31, wherein the intrusion detection report is transmitted to the SGSN over an Gb interface.

37. The network node of claim 31, wherein the intrusion detection report is transmitted to a MSC over an Iu-CS interface.

38. The network node of claim 31, wherein the intrusion detection report is transmitted to the MSC over an A interface.

39. The network node of claim 31, wherein the intrusion detection report is transmitted to a Mobility Management Entity (MME) over an S1-C interface.

\* \* \* \* \*